United States Patent [19]

Wallace et al.

[11] 3,893,496

[45] July 8, 1975

[54] FRICTION COATING AND SEALANT FOR THREADED PARTS

[75] Inventors: Richard B. Wallace, Bloomfield Hills; Sidney L. Reegen, Oak Park, both of Mich.

[73] Assignee: The Oakland Corporation, Troy, Mich.

[22] Filed: July 27, 1973

[21] Appl. No.: 383,059

Related U.S. Application Data

[63] Continuation-in-part of Ser. No. 231,420, March 2, 1972, abandoned.

[52] U.S. Cl............................... 151/14.5; 260/827
[51] Int. Cl.............................................. F16b 39/00
[58] Field of Search ........... 85/1 C; 151/14.5, 14, 7; 117/132 C; 260/827

[56] References Cited
UNITED STATES PATENTS
3,022,197  2/1962  Jedlicka ....................... 85/1 C
3,814,156  6/1974  Bachmann et al................ 151/14.5

FOREIGN PATENTS OR APPLICATIONS
690,770  4/1953  United Kingdom..................... 151/7

*Primary Examiner*—Edward C. Allen
*Attorney, Agent, or Firm*—Whittemore, Hulbert & Belknap

[57] ABSTRACT

A viscous non-tacky friction coating or deposit is provided on the threads of a threaded part to frictionally oppose separation of the coated part from a mating threaded member. The coating comprises a mixture of one or more suitable acrylic resins, and silicone or a polyamide. In one embodiment the resin includes finely divided material such as nylon plastic which cooperates with the viscous resin material to provide a sealant impervious to relatively high gas pressure.

34 Claims, 2 Drawing Figures

FRICTION COATING AND SEALANT FOR THREADED PARTS

CROSS-REFERENCE TO RELATED APPLICATION

The present application is a continuation-in-part of our prior copending application Ser. No. 231,420, filed Mar. 2, 1972 now abandoned.

BRIEF SUMMARY OF THE INVENTION

The present invention relates to a threaded part, either male or female, in which the threads of a portion thereof are treated with a resinous material applied in substantially fluid form and dried to a condition in which the resinous material is strongly adherent to the thread surfaces to which it is applied, and remains in a slightly viscous condition internally, but which has a completely non-tacky exposed surface which permits mingling of treated bolts or the like without the possibility of the parts sticking together. This of course does not imply that the interior of the dried resin, if exposed, would be tacky.

In our prior copending application reference was made to a resinous material which was essentially a polyurethane but which included a certain relatively small percentage of a silicone resin for the purpose of promoting adhesion between the resinous mixture and the surface of the threads.

It has been found that greatly superior results are obtained when the basic resin is essentially acrylic in nature, and the adhesion promoting addition may be either a polyamide or a silicone. Chemical compositions of suitable resinous mixtures will be described subsequently. At this point it is only necessary to note that essentially the resinous material applied to the threads of the threaded member is acrylic and includes sufficient silicone resin or polyamide to provide a required degree of adhesion to the surface of the threads. In general, the amount of silicone is less than 20% by weight, is preferably between 5 and 15% by weight, and entirely satisfactory results have been obtained when the percentage by weight of the silicone resin is 10% of the resinous mixture. Of course, more may be used, but cost considerations suggest minimum proportions of silicone.

Alternatively, a polyamide with amine end groups may be substituted for the silicone resin, with improved adhesion characteristics and further unexpected improvement in functional characteristics. Specifically, the resins including the polyamide may be applied initially at low torque, and thereafter the torque increases significantly over original installation value.

While a certain degree of sealing against the leakage of liquids or gas under pressure along the threads of two mating threaded parts, one of which is treated as disclosed herein, is obtained, much improved results from the standpoint of resistance to leakage of high pressure gas or liquid are obtained when the resinous mixture includes a finely divided, relatively solid material. Excellent results have been obtained when the material is nylon plastic.

The resinous mixture disclosed herein may be applied to the threads in a variety of ways, such for example as suspending the threaded part with the axis of the threads extending vertically and applying a measured quantity of the fluid resinous material to an intermediate point of the threads. In this case the fluid resinous material flows downwardly around the threads a distance determined by the quantity of material applied. By applying a relatively small amount of material, the longitudinal extent of the area of coated threads may be controlled, and the end or an entering portion of the threads may be left in uncoated condition. Usually however, the threaded parts such as bolts are suspended with their axes vertical and passed across a horizontally directed stream of fluid polymer, with the excess material draining off the bottom end of the part.

Alternatively of course, the threaded members, as for example in the form of a bolt, may have the threaded ends thereof dipped into the fluid resinous composition, after which the excess material may be permitted to drain off the end.

In any case, after the application of the resinous material in fluid condition, a solvent which determines the fluidity of the resinous material is evaporated. By employing a relatively volatile solvent, drying time and temperature may be reduced to a minimum. However, it is to be noted that the acrylic resins disclosed herein may without detriment thereto be subjected to relatively high temperatures, as for example 350° F., for driving off the solvent.

In use, the resinous material builds up to form a deposit of substantial thickness in the bottom of the thread grooves and at the same time establishes a strong bond by adhesion to the surface of the threaded part. When the coated threaded element is engaged with a mating thread, the resinous deposited material provides a substantial frictional resistance to turning between the threaded members but nevertheless, permits the parts to be moved to the required position. Thereafter, due to the relatively high viscosity of the resinous deposit at its interior, the friction material strongly resists rotation between the threaded elements and is particularly effective in opposing sudden shock application of reversing loads as may be experienced in vibration. On the other hand, the material is capable of yielding to a slow steady unidirectional pressure as might be the case in disassembly of the threaded parts.

DETAILED DESCRIPTION

Figure 1:
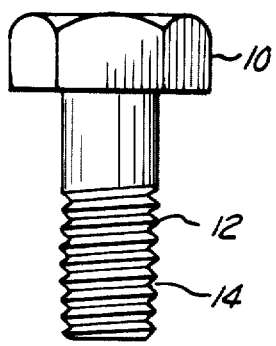
FIG. 1 is an elevational view of a bolt having a threaded portion, the lower part of the threaded portion being treated with the friction material.

The present invention depends upon the use of a thick resinous material for the purpose of establishing and maintaining a frictional resistance to relative motion between adjacent surfaces of relatively movable members. Since the major field of criticality for this purpose is in establishing a frictional resistance to relative rotation between threaded members, the description will be essentially directed to this embodiment of the invention.

Referring now to the drawing, 10 represents a bolt having a threaded portion having threads 12, the lower part of the threaded portion as indicated at 14 being illustrated as treated with the friction material in a manner to build up a deposit of the friction material in the thread grooves.

Figure 2:
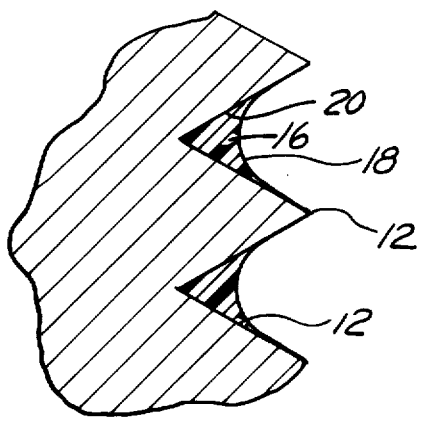
FIG. 2 is an enlarged fragmentary view diagrammatically illustrating the deposit of friction material concentrated in the bottom of the thread grooves.

In FIG. 2 there is an enlarged fragmentary section illustrating the manner in which the resinous material, here indicated at 16, concentrates in the inner or bottom portion of the thread grooves 12. It will be observed in this Figure that the resinous material, which is applied in fluid form, flows, evidently as a result of internal forces and surface tension, to provide a curved meniscus-like surface designated 18, which assumes substantial tangency with the surface 20 of the threads 12 adjacent the crests of the threads. As a result of this the crests of the threads themselves remain uncoated, which permits starting engagement between a coated and an uncoated pair of threaded members. This feature further permits unrestricted passage of a thread through clearance holes in a mating part at time of assembly.

In FIG. 2 the depth of deposit is somewhat exaggerated for clarity but the amount of resinous material which is deposited is sufficient to provide complete sealing of the threaded connection. It is of course well understood that some clearance exists between mating threaded elements, and in particular, space between the crests of one thread and the root or bottom of the thread groove of the mating thread. Thus, the resinous material constitutes a seal which prevents flow of fluid along the thread as would otherwise occur.

A very important advantage of the resinous material and the parts treated therewith in accordance with the present invention is that the resinous material prior to application may be treated at relatively high temperatures effective to drive off toluene, in which both the acrylic resin and the silicone resin are contained as obtained from the manufacturer. The silicone resin by itself is susceptible to cross-linking when subjected to high temperatures. However, it has been observed that when mixed in the relatively small proportions disclosed herein, this tendency of the silicone resin to cross-link is apparently reduced. The acrylic resins do not cross-link and accordingly, the relatively high temperatures to which they may be subjected do not in any way disturb the physical properties.

Where the polyamide is substituted for silicone, there is no problem in boiling off the higher temperature solvents since the polyamide does not contain solvents in its purchased form.

A very important advantage of the present invention is that the mixture of acrylic resins and silicone may be completely dried so as to provide a solid having about the consistency of a heavy wax. This material is completely inert and can be shipped without any particular protection against environment. At the same time it may readily be reconstituted into the fluid form for application to the threaded parts simply by mechanically dissolving it in a suitable solvent.

One of the uses of the resinous material disclosed herein is for application by the individual user, for which purpose it is bottled and may be sold at retail in relatively small quantities. The resinous mixture disclosed herein, essentially acrylic, has substantially unlimited shelf life.

Another very important advantage of the resinous materials disclosed herein, while superior to anything heretofore used, is that they are readily available and are inexpensive.

The acrylic resins may be obtained in a range of hardness ranging from extremely hard material to substantially heavy liquid form. As will appear more specifically hereinafter, a range of acrylics from which a suitable acrylic may be selected is determined by the number of carbon atoms in the group extending from the acrylic chain. The present invention is concerned only with physical properties, and it is found that for purposes of the present invention a single acrylic resin may be selected having the required physical properties, with particular reference to hardness and viscosity when dried. However, substantially identical results may be obtained by a mixture of two acrylic resins, one of which is harder and the other of which is softer than the desired resinous deposit. This latter approach permits the easy adjustment of "dry" viscosity of the finished coating to meet the special needs of different customers.

As indicated above, the resinous mixtures of the present invention are applied in fluid and substantially liquid form, the fluidity of the material being dependent upon the amount of solvent in which the resin has been dissolved. At one extreme, propylene oxide has been tried as a solvent but this evaporates too fast and gives too fast drying for practical production applications. Methyl-ethyl-ketone (MEK) has been used alone or as a mixture with propylene oxide. The result of a mixture of these solvents is material which will dry at room temperature in a matter of minutes, and by selecting the solvents, the drying time may be controlled as required. Normally, it must be kept in mind that where a mixture of two solvents is employed, the one having the shorter drying time is eliminated first and the final drying time is accordingly determined by the least volatile solvent. In any case, the selection of solvents is made on the basis of the time required and any suitable solvent or mixture of solvent is acceptable.

It is pointed out that the acrylic resinous material and the silicone are completely compatible and are in general satisfactorily dissolved by the same solvents so that no difficulty is encountered in compounding a mixture with the required initial fluidity and drying time.

Where polyamide is used in place of silicone, the polyamide, as will be explained hereinafter, has a marked thickening action on the acrylic solution, so that excess solvent is required to produce the desired final consistency for application to the threaded part.

One of the advantages of the present materials is that they permit application to a threaded part in which the final shape of the deposit is determined by the affinity of the resinous mixture for the threads. It is believed that the silicone resin or polyamide promotes "wetting" of the surface with the resin and thus, promotes flow around the thread while at the same time providing for a thickened deposit in the bottom of the thread grooves as well as the adhesion.

As previously noted, silicone resins when present as a minor proportion in the resinous mixture are not adversely affected during preparation by temperatures substantially above those which would cause the pure silicone resin to completely cure or cross-link.

THE RESINOUS MATERIAL

The invention as described in the foregoing relates to the application to the threads of a threaded member of acrylic or methacrylic polymers, specifically resins, and an organopoly-siloxane, specifically a silicone resin or a polyamide resin having active amine end groups. The acrylic and methacrylic polymers are made by the polymerization of the acrylic and methacrylic monomers.

THE ACRYLIC RESIN

Two general types of monomers are available for the production of acrylic resins. These are the acrylate monomers and the methacrylate monomers. For convenience, polymers produced from both types are usually referred to as acrylic polymers. The basic acrylic formula is:

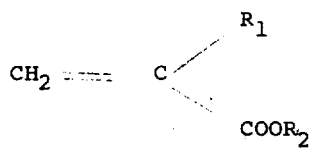

wherein $R_1$ is hydrogen or a methyl group and $R_2$ is an aliphatic group, such as an alkyl group or hydrogen.

The acrylic and methacrylic polymers useful in the practice of the present invention may be made from a variety of acrylic and methacrylic monomers, preferably the esters of acrylic and methacrylic acids. Since all of the monomers contain one ethylene double bond, they can be polymerized by free radicals to yield high-molecular-weight polymers.

If $R_1$ is hydrogen then the above basic acrylic formula becomes:

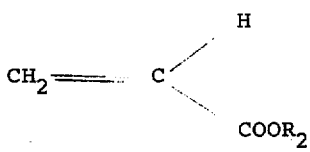

which is the general formula of an acrylic ester or an acrylate.

If $R_1$ is a methyl group then the basic acrylic formula becomes:

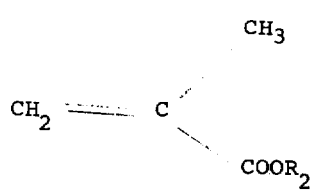

which is the general formula for a methacrylic ester or a methacrylate. Acrylic acid or methacrylic polymers can also be used.

The acrylics have a wide range of physical properties, depending on the type of monomer or monomers used. In general, for both polyacrylates and polymethacrylates, the lower esters, those with lower alkyl groups represented by $R_2$, are tougher and harder. As the esters get higher; that is, as the alkyl groups represented by $R_2$ increase in the number of carbon atoms, they become softer.

When the acrylate and methacrylate monomers are polymerized, the resulting polymers have the general structural formulas:

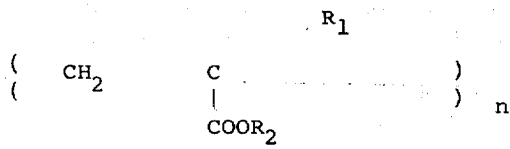

where $R_1$ is again a hydrogen or a methyl group and $R_2$ is an alkyl group.

When $R_1$ is hydrogen, then the above formula becomes:

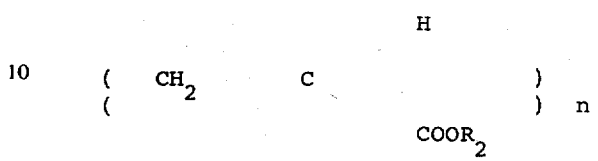

which is the general formula for an acrylic polymer.

Where $R_1$ is a methyl group, then the aforesaid formula becomes:

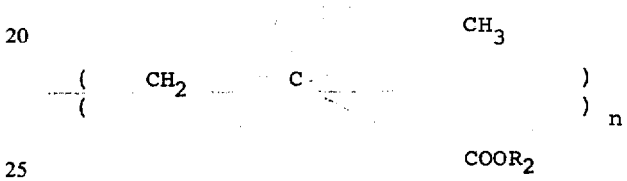

which is the general formula for a methacrylic polymer.

As the size of the alkyl groups represented by $R_2$ increases, the hardness of the polyacrylate or polymethacrylate decreases and the tackiness of the outer surface of the coating likewise changes. Thus, for example, a polymethacrylate having the general structural formula:

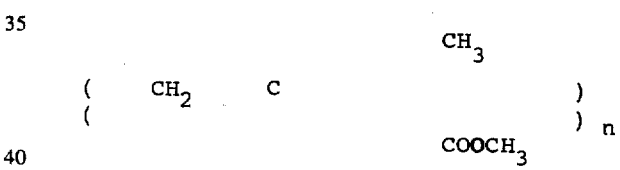

has a hardness of 80–100 Rockwell scale M and a non-tacky outer surface. A polymethacrylate wherein $R_2$ is a lauryl group ($C_{12}H_{25}$) and having the structural formula:

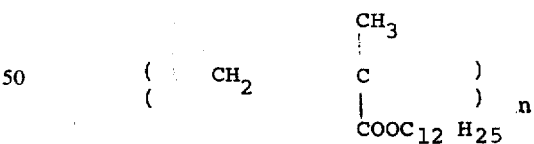

which is a polylauryl methacrylate when applied to the surface of the threads of a threaded member forms a rather soft coating with a slightly tacky outer surface.

For the purposes of the present invention it has been found that the degree of hardness of the acrylic and/or methacrylic polymers most suitable and useful is achieved when $R_2$ is an alkyl group selected from the group consisting of methyl to lauryl inclusive. Thus, $R_2$ can be a methyl group, an ethyl group, a propyl or isopropyl group, a butyl or isobutyl group, a pentyl, isopentyl or neopentyl, a hexyl or any of the isomeric hexyl groups, a heptyl or any of the isomeric heptyl groups, an octyl or any of the isomeric octyl groups, a nonyl or any of the isomeric nonyl groups, a decyl or any of the isomeric decyl groups, an undecyl or any of the isomeric undecyl groups, and a lauryl or any of the isomeric lauryl groups.

It has been found that the alkyl groups larger than the lauryl group or its isomers will produce a coating which is quite soft and has a rather tacky surface, and although this coating will still work to produce a self-locking threaded member, it will not produce a coating with the optimum desired characteristics.

The aforedescribed acrylic and methacrylic polymers to which the silicone or polyamide resin is added, are dissolved in an appropriate organic solvent such as propylene oxide, methyl-ethyl-ketone, toluene, acetone, benzene, trichloroethane, and the like. The liquid polymer-solvent mixture is then applied to the threads of the threaded member. After application the solvent is evaporated. This is done by either heating the treated member to evaporate the solvent, or if the solvent is one which has a low boiling point, by air drying the coated member to evaporate the solvent. Whether or not the coated member needs to be subjected to heat to evaporate the solvent depends on the type of solvent used and is purely a matter of choice. Thus, if a solvent such as propylene oxide which has a very low boiling point, is used, then air drying is sufficient to evaporate the solvent. If a solvent such as toluene, which has a rather high boiling point, is used, then air drying is not sufficient to evaporate the solvent and the treated part must be subjected to heat.

When the solvent is driven off there remains a deposit of the acrylic, methacrylic, or a mixture of the acrylic and methacrylic polymer together with the silicone or polyamide resin. This deposit adheres to the threads and has a non-tacky outer surface. It has been found that this deposit has the unusual property of having its internal cohesive strength exceeded by its external surface adhesion to the metal of the coated threaded member, and by the frictional forces developed between its non-tacky outer surface and the metal of the mating nut. Thus, upon the application of a predetermined torque internal shear or separation between the material takes place and the material exhibits internal flow. Upon cessation of the external torque the material re-establishes itself. While this internal separation and flow of the material occurs the adhesive bond between the material and the treated threaded member and the frictional bond between the non-tacky outer surface of the material and the mating nut or other threaded member remain intact and are not broken.

If the substituent $R_2$ group is small, as for example a methyl or ethyl group, the dry polymeric coating has a completely non-tacky outer surface and is very hard. Furthermore, the internal cohesive bond is only slightly less than the external cohesive and frictional bonds. As the size of the substituent $R_2$ groups increases, as for example an undecyl ($C_{11} H_{23}$) or a lauryl ($C_{12} H_{25}$), the coating becomes softer and the internal cohesive bond becomes progressively weaker than the external adhesive and frictional bonds and the internal flow or shear becomes more pronounced.

It is also possible to vary the properties of the polymeric coating by, in addition to varying the substituent $R_2$ groups, mixing two or more acrylic polymers, each of which has a different $R_2$ group, or by mixing a methacrylic polymer with an acrylic polymer. Thus, for example, a coating having the optimum combination of an external adhesive bond and a non-tacky surface, as well as having an internal cohesive force which is less than the external adhesive and frictional bonds and thus having a correspondingly high degree of internal flow or a low shear point, is produced when a hard polymethyl methacrylate, where $R_2$ is a methyl group, is mixed with a soft polymethyl acrylate, where the $R_2$ group is a lauryl group.

SILICONE ADDITION

Although the adhesion of the acrylic and/or methacrylic polymer coating to the surface of the treated member is sufficient for most purposes, it is usually desirable to increase this adhesive bond. This is accomplished by adding an organopolysiloxane resin to the acrylic and/or methacrylic polymer.

The organopolysiloxane resins are materials having the general structural formula:

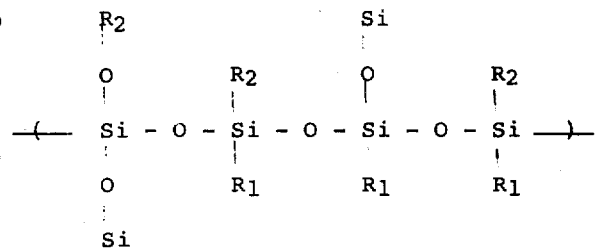

where $R_1$ and $R_2$ are methyl, ethyl and phenyl groups, and there is cross-linkage between the silicon atoms of one chain and the silicon atoms of another chain.

It has been found that a silicone resin wherein $R_1$ and $R_2$ are methyl and phenyl groups is quite effective in increasing the adhesion of the silicone resin-acrylic composite coating to the threads of the coated member.

In preparing this silicone resin-acrylic composite the silicone resin, such as a methyl phenyl silicone resin, is added in an amount of from about 5% to about 15%, and preferably about 10%, by weight to a solution of the acrylic and/or methacrylic polymer dissolved in a solvent. The resulting mixture is then applied to a threaded member and the solvent is evaporated.

The following are some examples of various formulations of the acrylic resins used above or in conjunction with a silicone resin:

EXAMPLE 1

A methyl methacrylate polymer was dissolved in a solvent consisting of a mixture of propylene oxide and methyl-ethyl-ketone. To this was added 5% by weight of a methyl phenyl silicone resin dissolved in a solvent. The resulting solution was applied to a threaded member and then allowed to dry at room temperature. The resulting coating had a non-tacky surface and was fairly hard.

EXAMPLE 2

A mixture was compounded which consisted of essentially equal parts by weight of a polymethyl methacrylate and polylauryl methacrylate. To this mixture was added sufficient solvent trichloroethane to liquefy the mixture. To this liquefied mixture was added 10% by weight of a silicone resin. The resulting solution was applied to a threaded member and the solvent was driven off to leave a solid coating. This coating had a non-tacky surface and was less hard than the coating of Example 1.

EXAMPLE 3

A polybutyl acrylate was dissolved in a solvent consisting of a mixture of propylene oxide and methyl-ethyl-ketone. To this was added 15% by weight of a silicone resin. The resulting solution was applied to a threaded member. The treated member was air dried and upon drying there remained a solid coating of a butyl acrylate-silicone resin. This coating was softer than the coating produced in Example 1.

EXAMPLE 4

A polylauryl methacrylate was dissolved in sufficient solvent such as acetone, to form a solution. To this was added 10% by weight of a methyl phenyl silicone resin dissolved in a solvent. The resulting solution was then applied to a threaded member. The threaded member was heated to drive off the solvent. The solvent free polylauryl methacrylate-silicone resin formed a rather soft coating, one which was much softer than the coating of Example 1.

EXAMPLE 5

To a polyethyl methacrylate was added sufficient solvent to form a viscous liquid solution. To this solution was added an approximately equal amount of a second solution consisting of a polylauryl acrylate dissolved in sufficient solvent to form a viscous liquid solution. To this was added 10% by weight of a methyl phenyl silicone resin. The two solutions were mixed and applied to a threaded member. The coated member was then exposed to a drying process wherein the solvent evaporated and left a solid coating of an ethyl methacrylic and lauryl acrylic-silicone resin, which coating was slightly softer than the coating of Example 2.

EXAMPLE 6

A polymethyl methacrylate was dissolved in sufficient organic solvent to form a viscous liquid solution. To this solution was added about 10% by weight of a methyl phenyl silicone polymer dissolved in sufficient organic solvent to form a liquid solution, and about 10% of a solid nylon powder of a size of 0.004 inch. The resulting mixture was applied to a threaded bolt. The bolt was then heated to drive off the solvents and to cross-link the methyl phenyl silicone polymer to a methyl phenyl silcone resin. The resulting coating of non-cross-linked polymethyl methacrylate, the methyl phenyl silicone resin, and the nylon powder had a non-tacky outer surface and was approximately of the same hardness as the coating of Example 1.

EXAMPLE 7

The same as Example 6 except that the methyl phenyl polysiloxane comprises about 5% by weight of the mixture and the nylon powder comprises 30% by weight of the mixture.

POLYAMIDE ADDITION

In a second embodiment of the present invention, instead of a suitable silicone resin, a polyamide, more specifically a polyamide resin, with active amine end groups is added to the acrylic. The polyamide resins having active amine end groups are produced by the reaction of a polybasic acid, preferably a dibasic acid, and an excess of a polyamine, preferably a diamine. The carboxylic dibasic acids have two hydrogen atoms capable of replacement by basic atoms or radicals and have the general formula:

$$HOOC - R - COOH$$

where R is a hydrocarbon group. The diamines used in this embodiment of the invention have the general formula:

$$H_2N - R' - H_2N$$

where R' is a hydrocarbon group. The polyamide resins containing active amine end groups which are produced by this reaction of a dibasic carboxylic acid and a diamine have the general structural formula:

$$H_2N-R' - HN(-OC - R - CONH - R' - NH-)_n H$$

where R is the hydrocarbon group of the dibasic carboxylic acid and R' is the hydrocarbon group of the amine.

Some representative examples of the dibasic carboxylic acid which can be used to produce the polyamide resin with active amine end groups are adipic acid, dimerized linoleic acid.

Some representative examples of the diamines which can be used to produce the polyamide resin with active amine end groups are ethylene diamine, trimethylenediamine, tetramethylenediamine, pentamethylenediamine, hexamethylenediamine, metaphenylene diamine, and 4,4'' methylene dianiline.

In one example dimerized linoleic acid was reacted with an excess of ethylene diamine to produce a polyamide having active amine end groups and having the general structural formula:

$$H_2N - CH_2CH_2 - HN(-OC - R - CONH - CH_2CH_2 - NH-)_n H$$

where R is a hydrocarbon group of an indeterminate configuration containing 34 carbon atoms.

The linear polyamide with active amine end groups is added to the acrylic in an amount sufficient to form a mixture, once the solvent is driven off, of from about 2 to about 24% polyamide and from about 98 to about 75% acrylic. The preferred concentration of the polyamide is from about 10% to about 15% of the mixture.

In the practice of the present invention the polyamide is added to a solution comprising an acrylic polymer dissolved in a suitable solvent such as trichloroethane or methyl-ethyl-ketone. Upon addition of the polyamide to the acrylic polymer a complex formation process occurs between the polyamide polymer and the acrylic polymer. This process is not the usual type of cross-linking process wherein primary carbon bonds are formed but rather involves the formation of secondary hydrogen bonds. The secondary hydrogen bonds are formed by the attraction between the acid groups of the acrylic polymer $-COO(H^+)-$ and the active amine groups of the polyamide polymer $(-NH_2^--)$. This secondary hydrogen bonding produces complexes which are much weaker than the cross-links ordinarily formed by the primary bonds.

It has been found that the resulting polyamide-acrylic polymers possess several unusual and unexpected properties. These properties are due, in part, to the presence of the complexes. Thus, while possessing some of the characteristics normally associated with cross-linked thermoset materials, the polyamide-acrylic polymers also possess the properties of a thermoplastic material.

When cold the polyamide-acrylic resin exhibits many of the characteristics of a thermoset material. This, it is believed, is due to the presence of the secondary bonds. When heated, however, the polyamide-acrylic polymer exhibits the characteristics of a thermoplastic material in that it flows and can be molded but re-establishes itself when cooled. This, it is believed, is due to the fact that the secondary hydrogen bonds, which are weaker than the primary bonds and are primarily electrostatic in nature, are easily broken upon the application of heat but quite readily re-establish themselves when the material is cooled, a situation which does not occur with primary carbon cross-linkages.

This results in a material which is hard and has a non-tacky outer surface when cold but which will flow and will exhibit a tacky outer surface upon the application or development of sufficient heat. Also, the polyamide-acrylic polymer exhibits a greatly increased adhesiveness to the surface of a coated member as compared to the acrylic polymer alone.

The following are some examples of the various formulations of the acrylic resins in conjunction with the polyamide resins with amine end groups:

EXAMPLE 8

A composition comprising a methyl methacrylic polymer and 15% of a reaction product of dimerized linoleic acid and an excess of ethylene diamine.

EXAMPLE 9

A composition comprising a methyl acrylate polymer and 10% of a reaction product of dimerized linoleic acid and an excess of ethylene diamine.

EXAMPLE 10

A composition comprising equal parts by weight of a polymethyl methacrylate and polylauryl methacrylate and 13% of a reaction product of linoleic acid and an excess of ethylene diamine.

INTERLOCKING ACTION

One unexpected and unexplainable but highly useful property of the resin mixture consisting essentially of the acrylic and polyamide resin is that while the treated part, such as a screw, may be threaded to a bolt in its first usage with a relatively low torque, the torque builds up substantially after the parts have been screwed together and left. For example, after a very few minutes, such for example as 20 or 30 minutes, a very substantial build-up in torque to provide additional resistance to rotation or reverse rotation is noted. In one case, the increase in torque went from 35 to 95 inch./lbs.

Surprisingly enough, similar results are noted after the threaded parts have been disassembled and are re-assembled. Here, the torque of re-assembling is substantially lower than the torque build-up which takes place shortly after assembly. This physical characteristic is particularly advantageous since it permits the assembly of the threaded parts with a minimum of torque, and thereafter the parts are interlocked with a substantially greater torque.

In either embodiment of the invention, where the additive to the acrylic resin is a silicone resin or a polyamide resin as disclosed herein, the threaded parts may be assembled and disassembled numerous times while retaining the ability to produce a substantial and useful interlock.

The use of the polyamide resin in conjunction with the acrylic resin produces superior adhesion. No cases have been noted where separation occurs where the resin includes the polyamide resin. The product adheres perfectly, even to cadmium plate.

Since the application of resin does not extend radially outwardly beyond the ends of the crests, the introduction of the screw into mating relation in a nut is readily accomplished without substantial resistance, even where the resinous deposit is applied in such a way as to continue to the entering end of the screw. In this case, the entering end of the thread of the mating part enters into threaded engagement with the treated part upon a partial rotation with only minimal resistance to turning.

The acrylic resin is available in solution, toluene being the usual solvent. The solution of the acrylic resin may be brought to a substantial temperature as for example 350° F., without modifying the acrylic resin. In practice the solvent is driven off by the application of heat, leaving the acrylic resin in the form of a solid, yieldable mass. In this condition the material may be shipped without any difficulties and may be further compounded before use as disclosed herein.

ADDITIVES

While the resinous mixture is highly useful without additives, superior results and different and improved functions are obtainable by the addition of certain solids.

The resinous mixture when applied to a thread as disclosed in the foregoing, provides a sealing action which prevents leakage along a thread and hence, longitudinally of the threaded part. This sealing action is greatly improved by the addition of solid powdered material having a dry volume of 10–40% of the complete mixture.

Excellent results have been obtained when the powdered material is a nylon powder and a particle size of about 0.004 inch. A threaded joint provided with a resinous sealant including this powdered nylon has been tested at 900 psi and at temperatures up to 350° F. without leakage. In this test the liquid applied to the threaded connection under the pressure and temperature noted was gasoline, a material which is difficult to seal effectively.

Other solid materials may be used, and by way of example, fly ash and finely chopped glass fibers have been found to be effective.

The addition of any of these finely divided or powdered solids has the further desirable result of improving temperature resistance, while retaining the sealing characteristic, or the frictional resistance to turning, or both. For example, the use of the resinous material with the addition of the powdered nylon as described above provides a frictional resistance to turning at 300° F. which is as great as the frictional resistance to turning of the plain resinous mixture (without the powdered nylon) at 130° F. It is believed this may be explained as a friction attributable to the nylon after the resinous carrier has softened so as to lose a significant part of its frictional effect.

A further beneficial result of the inclusion of finely divided solids is in the reduction of drying time required before use. One important field of use of the friction material is in bottled form, where the user dips the end of a screw or bolt into the bottle, and then must wait for at least most of the solvent to evaporate before use. This drying time is substantially reduced by the presence of the solid additive, and a higher level of torque is obtained more quickly.

It is desirable to provide a balance between the specific gravity of solvent or the dissolved resin and that of the solids, so that the finely divided solids do not settle out, or if they do, they are quickly and uniformly redistributed through the liquid by agitation. This is most conveniently accomplished by selecting a solvent, or mixing two or more solvents such that the particles remain suspended, or at least that quick setting does not occur.

A novel useful result is obtained where the specific gravity of the solid particles is less than that of the resin solution. In this case, where the material is bottled for use by dipping the end of the threaded member in the bottle, the solid particles tend to be concentrated at or near the top of the fluid mixture. Therefore, as a screw or bolt end is dipped into the mixture, it penetrates the concentration of solid particles and thus insures that the deposit on the threads contains a high proportion of solid particles.

APPLICATION

While the friction material may be applied in fluid form in different ways, the present preferred practice is to advance the screws continuously on a conveyor which suspends the screws with their axes vertical and with the heads up. The screws are advanced past a nozzle through which the continuous stream of the fluid resinous mixture is passing. The rate of the conveyor and the amount of the fluid resin are related such that a surplus of resin is provided and the resin flows down around the threads to the end of the screw and drips off.

As previously noted, an alternative method of application is the application of a measured amount to each screw which is designed to flow around the screw for only a limited distance, filling the threads at this portion of the screw, but leaving the entering end of the screw free of the resinous deposit.

The conveyor may be of substantial length so that a part requires an appreciable period, for example up to one minute, to reach the end of the conveyor. At this point the resinous material deposited in the thread grooves has materially dried so that the surface of the resin is substantially non-tacky. The threaded parts are ejected from the conveyor, as for example by an air jet, and are deposited into a receptacle containing water and water soluble oil. In general, when the treated parts are ejected into the receptacle solvent is not completely dissipated from the resin. However, the water and water soluble oil bath is warmed, by the continued deposition therein of warm treated parts, and the solvent continues to be expelled from the resin so that when a batch of treated parts is removed from the bath, there is no tendency for the parts to stick together. This is in part attributable to the presence of the water soluble oil in the bath.

While reference is made to the fact that the resinous deposit on the treated thread is viscous, it should be understood that this term is employed in the definition contained in the Handbook of Chemistry and Physics, published by The Chemical Rubber Co., Copyrighted in 1962. Here, the definition is as follows:

"Viscosity. — All fluids possess a definite resistance to change of form and many solids show a gradual yielding to forces tending to change their form. This property, a sort of internal friction, is called viscosity; . . . ."

What we claim as our invention is:

1. A friction construction comprising a first member having a smooth surface normally movable in sliding relation under pressure against a similarly shaped smooth surface of a companion member, said first member having a dry deposit of a solid friction producing material permanently bonded to the smooth surface of said first member prior to bringing said first member into juxtaposition to said companion member, said deposit having a non-tacky outer surface to prevent treated members from sticking together, having a high viscosity such that viscous flow takes place under continuous applied force, and characterized in that the resistance to separation of the bond to the smooth surface of said one member exceeds the resistance to viscous flow under continuous applied force, and in that the outer surface of said deposit has a high friction value opposing relative movement between said one member and a companion member, said material being essentially a resinous mixture comprising a major proportion of an acrylic polymeric material, and a minor proportion of an adhesion promoting polymer in an amount effective to increase the strength of the bond of the resinous mixture to the smooth surface of said first member compared to the strength of the characteristic bond between the acrylic polymeric material and the smooth surface.

2. A construction as defined in claim 1 in which said first member is a threaded member and said smooth surface is the flank of a thread.

3. A construction as defined in claim 2 modified to increase the effectiveness of the sealing action to prevent leakage of fluids under pressure along the thread and to maintain resistance to rotation of the treated member relative to the threaded companion member at substantially elevated temperature, in which the resinous mixture comprises a dispersion of solid particles therein, said solid particles having an average transverse dimension of about 0.004 inch.

4. A construction as defined in claim 3 in which said solid particles comprise particles of fly ash.

5. A construction as defined in claim 3 in which said solid particles comprise particles of finely chopped glass fibers.

6. A construction as defined in claim 3 in which said solid particles have a dry volume of 10–40% of the complete mixture.

7. A construction as defined in claim 3 in which the solid particles comprise particles of nylon resin.

8. A construction as defined in claim 2 in which the adhesion promoting polymer is an organopolysiloxane resin.

9. A construction as defined in claim 8 in which the polysiloxane resin is provided in an amount of 5–15% by weight of the acrylic resin.

10. A construction as defined in claim 8 in which the polysiloxane resin is provided in an amount of about 10% by weight of the acrylic resin.

11. A construction as defined in claim 2 in which the adhesion promoting polymer is a polyamide having active amine end groups.

12. A construction as defined in claim 11 wherein said polyamide is a reactive product of a polybasic carboxylic acid and a polyamine.

13. A construction as defined in claim 12 wherein said polybasic carboxylic acid is a dibasic carboxylic acid and said polyamine is a diamine.

14. A construction as defined in claim 13 wherein said dibasic carboxylic acid is dimerized linoleic acid.

15. A construction as defined in claim 13 wherein said diamine is ethylene diamine.

16. A construction as defined in claim 11 in which said adhesion promoting polymer is provided in an amount of 10–15% by weight of the resin mixture.

17. A construction as defined in claim 2 in which said acrylic polymeric material comprises a material selected from the group consisting of an acrylic polymer having the structure:

$$\left( CH_2 - C\genfrac{}{}{0pt}{}{H}{COOR} \right)_n$$

and a methacrylic polymer having the structure:

$$\left( CH_2 - C\genfrac{}{}{0pt}{}{CH_3}{COOR} \right)_n$$

wherein in both structures R is hydrogen or an alkyl group of from 1 to 12 carbon atoms.

18. A construction as defined in claim 17 wherein the acrylic polymeric material comprises a mixture of at least one acrylic polymer and at least one methacrylic polymer in which one of said polymers has a characteristic hardness greater than that of the mixture and another of said polymers has a characteristic hardness less than that of the mixture.

19. A construction as defined in claim 17 wherein the acrylic polymeric material comprises a mixture of at least two acrylic polymers in which one of said polymers has a characteristic hardness greater than that of the mixture and another of said polymers has a characteristic hardness less than that of the mixture.

20. A construction as defined in claim 17 wherein the acrylic polymeric material comprises a mixture of at least two methacrylic polymers in which one of said polymers has a characteristic hardness greater than that of the mixture and another of said polymers has a characteristic hardness less than that of the mixture.

21. A construction as defined in claim 17 in which the adhesion promoting polymer is an organopolysiloxane resin.

22. A construction as defined in claim 4 in which the polysiloxane resin is provided in an amount of 5–15% by weight of the acrylic resin.

23. A construction as defined in claim 4 in which the polysiloxane resin is provided in an amount of about 10% by weight of the acrylic resin.

24. A construction as defined in claim 17 in which the adhesion promoting polymer is a polyamide having active amine end groups.

25. A construction as defined in claim 24 wherein said polyamide is a reactive product of a polybasic carboxylic acid and a polyamine.

26. A construction as defined in claim 25 wherein said polybasic carboxyl acid is a dibasic carboxylic acid and said polyamine is a diamine.

27. A construction as defined in claim 26 wherein said dibasic carboxylic acid is dimerized linoleic acid.

28. A construction as defined in claim 26 wherein said diamine is ethylene diamine.

29. A construction as defined in claim 24 in which said adhesion promoting polymer is provided in an amount of 10–15% by weight of the resin mixture.

30. A construction as defined in claim 17 modified to increase the effectiveness of the sealing action to prevent leakage of fluids under pressure along the thread and to maintain resistance to rotation of the treated member relative to the threaded companion member at substantially elevated temperature, in which the resinous mixture comprises a dispersion of solid particles therein, said solid particles having an average transverse dimension of about 0.004 inch.

31. A construction as defined in claim 30 in which said solid particles have a dry volume of 10–40% of the complete mixture.

32. A construction as defined in claim 30 in which the solid particles comprise particles of nylon resin.

33. A construction as defined in claim 30 in which said solid particles comprise particles of fly ash.

34. A construction as defined in claim 30 in which said solid particles comprise particles of finely chopped glass fibers.

* * * * *